Figure 1:
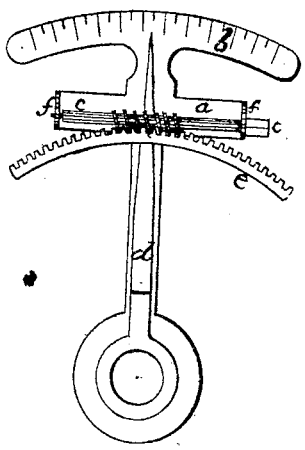
Figure 1:

71924 W. B. Tucker's
Imp'd Attachment to Watch Regulators

PATENTED
DEC 10 1867

WITNESSES

William B. Tucker
By his attorney
J. C. Robbins

United States Patent Office.

WILLIAM B. TUCKER, OF HILLSBORO, OHIO.

*Letters Patent No. 71,924, dated December 10, 1867.*

IMPROVEMENT IN ATTACHMENTS TO THE REGULATORS OF WATCHES.

The Schedule referred to in these Letters Patent and making part of the same.

TO ALL WHOM IT MAY CONCERN:

Be it known that I, WILLIAM B. TUCKER, of Hillsboro, in the county of Highland, and State of Ohio, have invented a new and useful Attachment to the Regulators of Watches and other time-keepers; and I do hereby declare that the following is a full and exact description thereof, reference being had to the accompanying drawing, which forms a portion of this specification.

For the purpose of more clearly illustrating my said invention, an exaggerated size is given to it in the accompanying drawing, the said drawing being about three times the usual dimensions of my said improved watch-regulator.

The scale base-plate $a\ b$ of my improved watch-regulator may be secured to the top plate or half plate of the watch-movements in any suitable manner. The regulating-lever $d$, which is pivoted to the half plate of the movements in the usual manner, carries a toothed segment, $e$, whose teeth match into the spaces between the turns of the thread of the screw-arbor $c$, which works in bearing-lugs $f\ f$, that rise from the extremities of the portion $a$ of the scale base-plate $a\ b$. The regulating-lever $d$ passes under the screw-arbor $c$, and its pointed extremity extends to and moves over the division lines of the scale portion $b$ of the scale base-plate $a\ b$, and thereby enables the position of the said lever to be adjusted to the nicest degree of accuracy.

The regulating-lever $d$ may be moved in either direction by turning the screw-arbor $c$, which can be done by the use of an ordinary watch-key. Or, should it be deemed preferable, motion may be imparted to the screw-arbor $c$ from a vertical pinion-arbor, and a pinion matching therewith on one end of the said screw-arbor.

The matching of the toothed segment $e$ with the screw-arbor $c$ insures the retention of the regulating-lever $d$ in the precise position to which it may be adjusted.

What I claim as my invention, and desire to secure by Letters Patent, is—

The combination of the screw-arbor $c$ and the toothed segment $e$ with the regulating-lever $d$ and the scale base-plate $a\ b$, substantially in the manner and for the purpose herein set forth.

The aforegoing specification of my improved attachment to the regulators of watches and other time-keepers, signed and witnessed, this 2d day of September, 1867.

WILLIAM B. TUCKER.

Witnesses:
   E. T. DE LANY,
   E. CLEY BRIGGS.